United States Patent
Houk et al.

(10) Patent No.: US 6,271,996 B1
(45) Date of Patent: *Aug. 7, 2001

(54) DAMPER WITH UNCONSTRAINED SURFACE FOR A DISK DRIVE HEAD SUSPENSION

(75) Inventors: Galen D. Houk, Hutchinson; Haiming Zhou, Eden Prairie, both of MN (US)

(73) Assignee: Hutchinson Technology Incorporated, Hutchinson, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,627

(22) Filed: Nov. 10, 1997

(51) Int. Cl.[7] .................. G11B 5/48; G11B 33/08
(52) U.S. Cl. .................. 360/244.9; 360/97.02; 360/265.9
(58) Field of Search .................. 360/104, 106, 360/97.02, 244.3, 244.9, 265.9, 244.2

(56) References Cited

U.S. PATENT DOCUMENTS

| | | | |
|---|---|---|---|
| 3,713,121 | 1/1973 | Fasano et al. | 360/103 |
| 4,208,684 | 6/1980 | Janssen et al. | 360/104 |
| 4,447,493 | 5/1984 | Driscoll et al. | 428/332 |
| 4,760,478 | 7/1988 | Pal et al. | 360/104 |
| 4,774,610 * | 9/1988 | Kinjo | 360/104 |
| 4,819,094 | 4/1989 | Oberg | 360/104 |
| 4,905,111 | 2/1990 | Tuma et al. | 360/126 |
| 5,079,660 | 1/1992 | Yumura et al. | 360/104 |
| 5,118,562 | 6/1992 | Johnson et al. | 428/327 |
| 5,187,625 | 2/1993 | Blaeser et al. | 360/104 |
| 5,299,081 | 3/1994 | Hatch et al. | 360/104 |
| 5,422,770 * | 6/1995 | Alt | 360/104 |
| 5,530,606 | 6/1996 | Baasch et al. | 360/104 |
| 5,572,387 | 11/1996 | Brooks, Jr. et al. | 360/104 |
| 5,623,758 | 4/1997 | Brooks, Jr. et al. | 29/603.01 |
| 5,790,348 * | 8/1998 | Alfred et al. | 360/106 |
| 5,796,553 * | 8/1998 | Tangren | 360/104 |
| 5,801,905 * | 9/1998 | Schirle et al. | 360/104 |
| 5,825,590 * | 10/1998 | Ohwe | 360/104 |

FOREIGN PATENT DOCUMENTS

| | | |
|---|---|---|
| 0 121 057 A1 | 10/1984 | (EP) . |
| 0 617 411 A2 | 9/1994 | (EP) . |
| 56-19554 | 2/1981 | (JP) . |
| 57-105860 | 7/1982 | (JP) . |
| 61-061277 * | 3/1986 | (JP) . |
| 1-248372 * | 10/1989 | (JP) . |
| 4-079085 * | 3/1992 | (JP) . |
| 5-074130 * | 3/1993 | (JP) . |
| 8-203190 | 8/1996 | (JP) . |

* cited by examiner

*Primary Examiner*—Craig A. Renner
(74) *Attorney, Agent, or Firm*—Faegre & Benson LLP (57) ABSTRACT

A head suspension includes a damping structure having at least one unconstrained surface. A reservoir is formed on the head suspension preferably from epoxy resin. Visco-elastic damping material is dispensed into the reservoir to form a damper on the head suspension. The damper and reservoir act to damp resonance mode vibrations of the head suspension.

33 Claims, 13 Drawing Sheets

DAMPER WITH UNCONSTRAINED SURFACE FOR A DISK DRIVE HEAD SUSPENSION

BACKGROUND

Technical Field

The present invention relates generally to suspensions for supporting read/write heads over recording media. In particular, the present invention is a head suspension having damping structures.

BACKGROUND OF THE INVENTION

Magnetic head suspensions are well known and commonly used with dynamic magnetic storage devices or drives with rigid disks. The head suspension is a component within the disk drive which positions a magnetic read/write head over the desired position on the storage media where information is to be retrieved or transferred. Head suspensions typically include a load beam supporting a flexure to which a head slider having read/write head is mounted. The head slider allows the read/write head to "fly" on an air bearing generated by the spinning magnetic disk. The flexure allows pitch and roll motion of the head slider and read/write head as they move over the data tracks of the magnetic disk. Head suspensions can also include an actuator arm to which the load beam is mounted and which is for attachment to a voice coil or other type of actuator.

With the advent of more powerful computers and the rapid growth in the personal computer market it has become increasingly more important to enable the user to access data from storage devices with increased speed and accuracy. Because of this need to reduce access times to enable rapid retrieval of data it has become increasingly important to reduce levels of vibration of components within the rigid disk drive. In relation to this, an important consideration in the design of head suspensions is resonance characteristics. Resonance vibrations of drive components can cause instability of the drive's servo system. It also may delay the transfer of data because the data cannot be confidently transferred until the amplitude of the vibration has substantially decayed.

Of particular importance are the first and second torsion resonance modes and lateral bending (or sway) resonance modes of vibrations. These resonance modes can result in lateral movement of the head slider at the end of the head suspension and are dependent on cross-sectional properties along the length of the load beam. Torsion modes sometimes produce a mode shape in which the tip of the resonating suspension moves in a circular fashion. However, since the head slider is maintained in a direction perpendicular to the plane of the disk surface by the stiffness of the load beam acting against the air bearing, lateral motion of the rotation is seen at the head slider. The sway mode is primarily lateral motion.

The use of dampers on head suspensions to decrease resonance vibrations is generally known and described in U.S. Pat. Ser. No. 5,187,625 issued to Blaeser et al. on Feb. 16, 1993 and U.S. Pat. Ser. No. 5,299,081 issued to Hatch et al. on Mar. 29, 1994.

Use of dampers in head suspension design and construction typically involves use of constraint layers to cover otherwise exposed surfaces of the damper. Constraint layers are often formed from stainless steel or other rigid material. Therefore, they can add weight to the head suspensions. Additional weight in the head suspension can adversely impact shock characteristics thereof. In particular, it can increase the amount of time for avibration caused by aphysical shock to the head suspension, which may simply be caused by stopping the head over data track, to decay to a point where information can be accessed from the disk. As such, increased mass can result in increased information access times.

Increased mass in the head suspension can also require more power for the voice coil actuator to move the head suspension over the spinning disk surface, particularly in multiple disk and multiple head drives. Increased power consumption is particularly problematic with drives used in battery operated systems such as laptop computers.

Accordingly, there is a continuing need for improved damping of head suspensions. In particular, addition of damper material to a head suspension should change as little as possible the properties of the load beam (e.g. gram loading, spring rate, shock performance, etc.) and should add as little weight as possible to the head suspension. Further, it is advantageous if the method of damping can be used on a variety of head suspension designs. Additionally, the damped suspension should be reliable and capable of being efficiently manufactured.

SUMMARY OF THE INVENTION

The present invention is an improved damper structure for a head suspension. The head suspension includes a load beam with a mounting region at a proximal end, a rigid region adjacent to a distal end, and a spring region between the mounting region and the rigid region. A flexure is located at the distal end of the load beam for supporting a read/write head. A damping region having a continuous surface is also formed on the head suspension. Damping material is located on the damping region and has at least one unconstrained surface. The damping material is for damping resonance vibrations of the head suspension.

In one embodiment, at least one reservoir is located in the damping region of the head suspension. The reservoir can be formed by walls of epoxy resin or it can be formed from the material of the head suspension itself by either stamping or partial etching. Damping material is dispensed into the reservoir to form a damper. The damping material is preferably visco-elastic material.

A method of fabricating the head suspension includes providing a load beam as described above and forming thereon a continuous damping region. Damping material is placed in the damping region such that one surface of the damping material remains unconstrained.

DETAILED DESCRIPTION OF THE PREFERRED EMBODIMENTS

Figure 1:
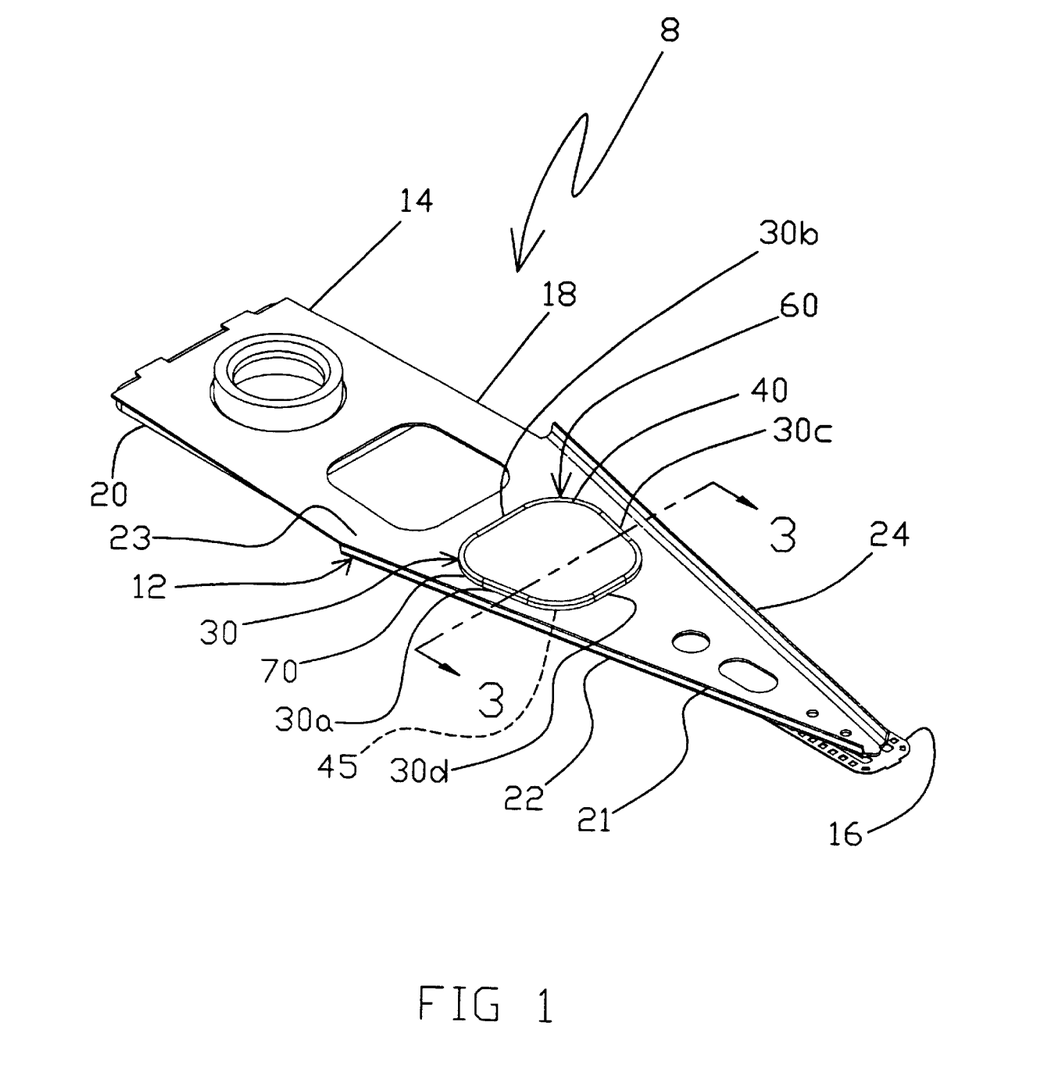
FIG. 1 is an isometric view of a head suspension including a load beam having a reservoir and damper mounted thereon in accordance with the present invention.

A first embodiment of a head suspension 8 in accordance with the present invention is shown in an isometric view in FIG. 1. Head suspension 8 includes a load beam 12 having a base or mounting region 14 on a proximal end, a flexure 16 on a distal end, a relatively rigid region 22 adjacent to the flexure, and a radius or spring region 18 between the mounting region 14 and rigid region 22. A base plate 20 is mounted to mounting region 14 for mounting the suspension 8 to a disk drive actuator arm (not shown). First and second edge rails 21 and 24 are formed in transversely opposite sides of the rigid region 22. Load beam 12 can be fabricated and formed from a sheet of stainless steel or other resilient material in a conventional manner.

A spring connection is provided between a head slider (not shown) and the distal end of the load beam 12 by flexure 16 which permits the head slider to move in pitch and roll directions so that it can compensate for fluctuations of a spinning disk surface above which the slider 92 (shown in FIG. 5) "flies." Many different types of flexures, also known as gimbals, are known to provide the spring connection allowing for pitch and roll movement of the head slider and are contemplated to be used with the present invention.

Load beam 12 includes a damping region 45 having damping structure 60 with at least one unconstrained surface. Damping structure 60 acts to reduce unwanted vibrations of head suspension 8. Damping structure 60 is formed by dispensing damping material which can include visco-elastic material and/or epoxy onto the head suspension 8. In the embodiment shown in FIG. 1, damping structure 60 is made up of a damper 40 contained within a reservoir 70 on the surface of head suspension 8. The region of head suspension 8 on which damping structure 60 (including reservoir 70 and damper 40) is formed is in the damping region 45. That is, damping region 45 includes the portion of head suspension 8 which is beneath and supports damping structure 60. Damping region 45 is unbroken or continuous, that is, there are no areas of damping region 45 which have apertures or holes passing entirely through head suspension 8. By making damping region 45 continuous in this way, dynamic characteristics such spring rate and gram loading of head suspension 8 are less affected.

Figure 2:
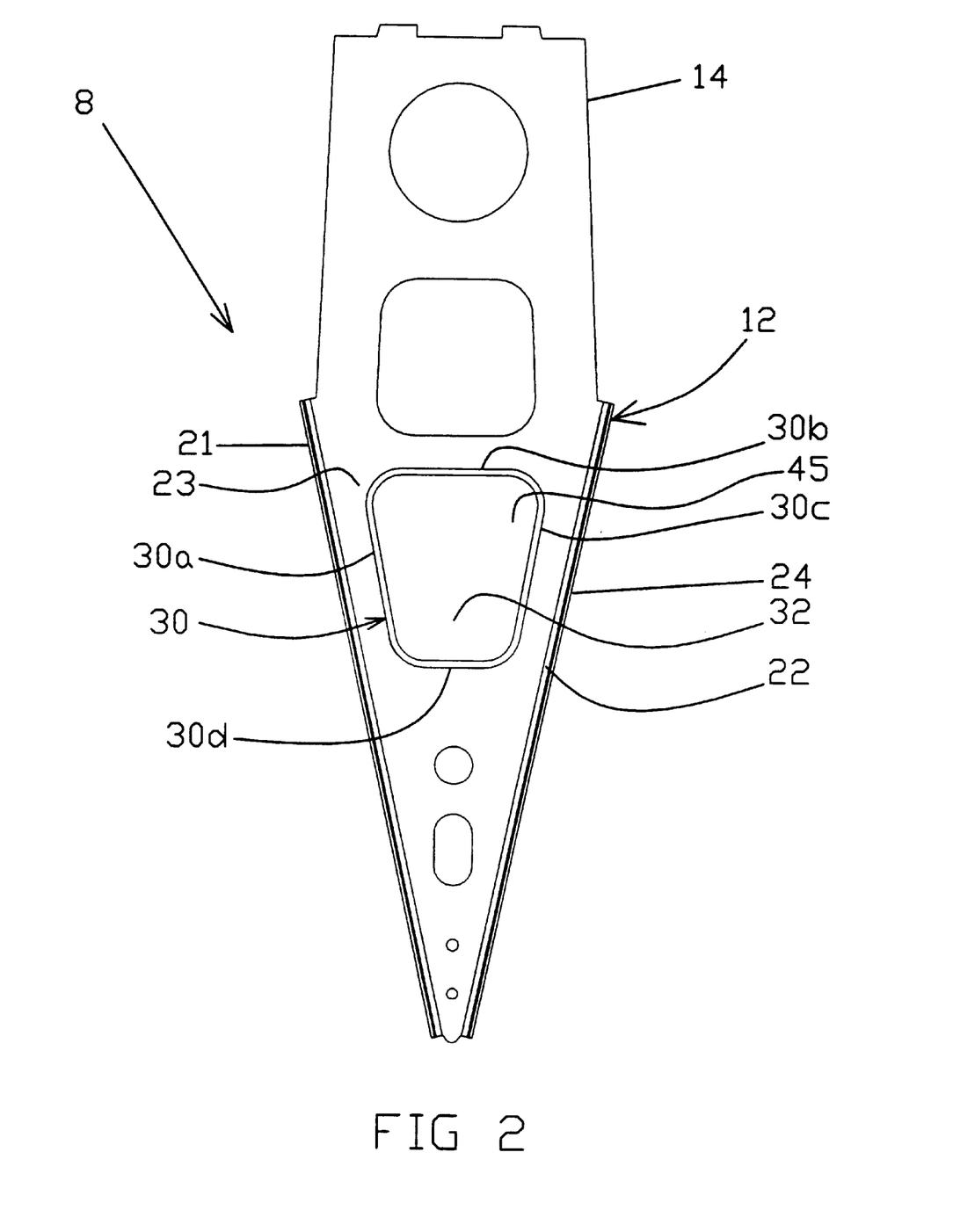
FIG. 2 is a top view of the load beam shown in FIG. 1 but without the damper material located in the reservoir.
Figure 3:
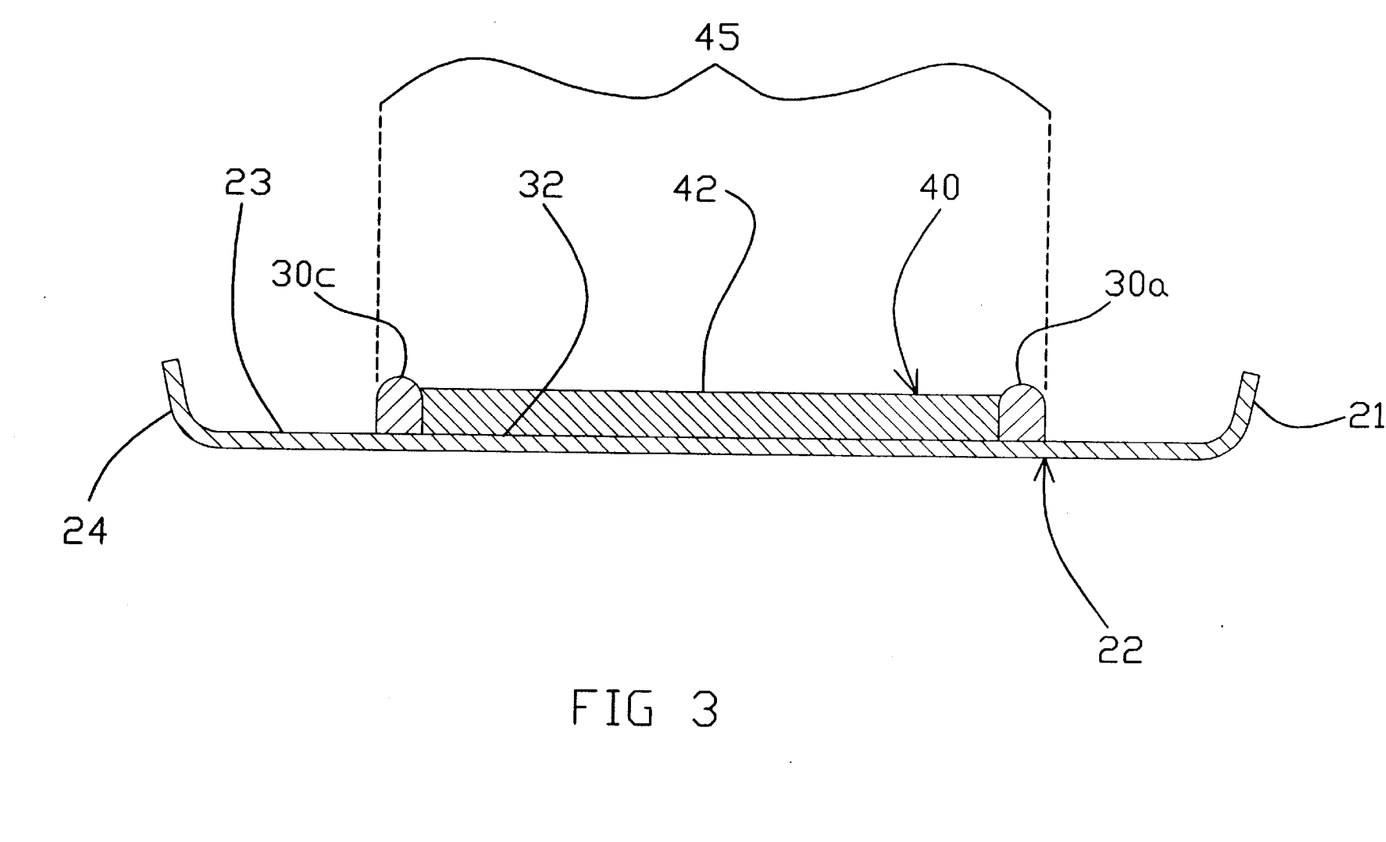
FIG. 3 is a sectional view of the load beam shown in FIG. 1 taken along section line 3—3 of FIG. 1.

Reservoir 70 is formed from a dam 30 of epoxy in the rigid region 22 of load beam 12 and is generally trapezoidal in shape. Dam 30, shown in FIG. 2 without damper 40, has a base 32 and four straight walls 30a, 30b, 30c, and 30d extending from the base 32. Base 32 of dam 30 is formed by a portion of a top surface 23 of the rigid region 22. Straight walls 30a and 30c are parallel with edge rails 21 and 24, respectively and straight walls 30b and 30d transversely connect wall 30a to wall 30c. Walls 30a through 30d are formed from a relatively high viscosity epoxy dispensed onto the top surface 23 of rigid region 22. An epoxy suitable for use in forming dam 30 is Electronic Materials Incorporated Emcast 1748 HTG-HV3, part number 30217118, available from TC Services, Inc. of Bloomington, Minn. However, any material which may be dispensed onto load beam 12 and hardened thereon is contemplated to be used with the present invention. Dispensing of such materials is known in the art and can be achieved by distributing the material onto the load beam 12 through a needle using an x-y positioning dispenser. The height of walls 30a, 30b, 30c, and 30d is controlled by the viscosity of the material, the size of the dispensing needle used, the travel speed of the x-y positioning dispenser, and the time between dispensing of the epoxy and curing thereof As shown in FIG. 3, which is a section view of load beam 12 taken along line 3—3 of FIG. 1, contained within dam 30 is damper 40 which can be formed of visco-elastic material. Damper 40 is constrained on 5 sides by base 32 and walls 30a–30d. However, a top surface 42 of damper 40 is unconstrained. Constraint layers on dampers used in disk drive suspensions are typically formed of stainless steel or other rigid material. These constraint layers add mass to the head suspension which, as noted above, can increase information access times of the disk drive. Because the top surface 42 of damper 40 remains unconstrained, the mass of load beam 12 is reduced from a design in which the top surface 42 of damper 40 would be constrained with a layer of rigid material such as stainless steel. This reduced mass improves the shock characteristics of the head suspension which can decrease disk drive information access times.

Figure 4:
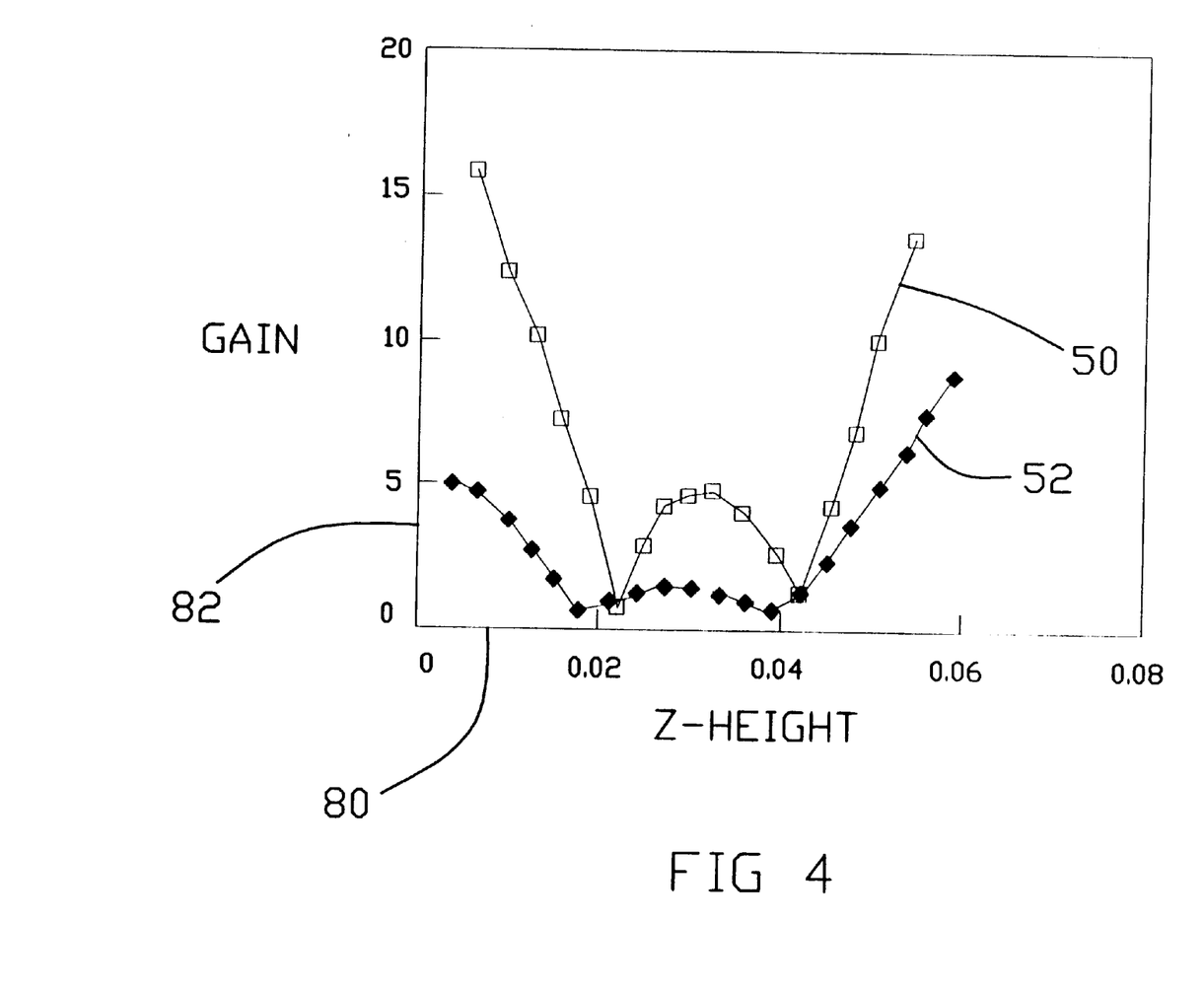
FIG. 4 is a graph showing resonance mode frequency amplitude gain versus Z-height for a head suspension similar to that shown in FIG. 1 both with and without a reservoir and a damper similar to that shown in FIG. 1.
Figure 5:
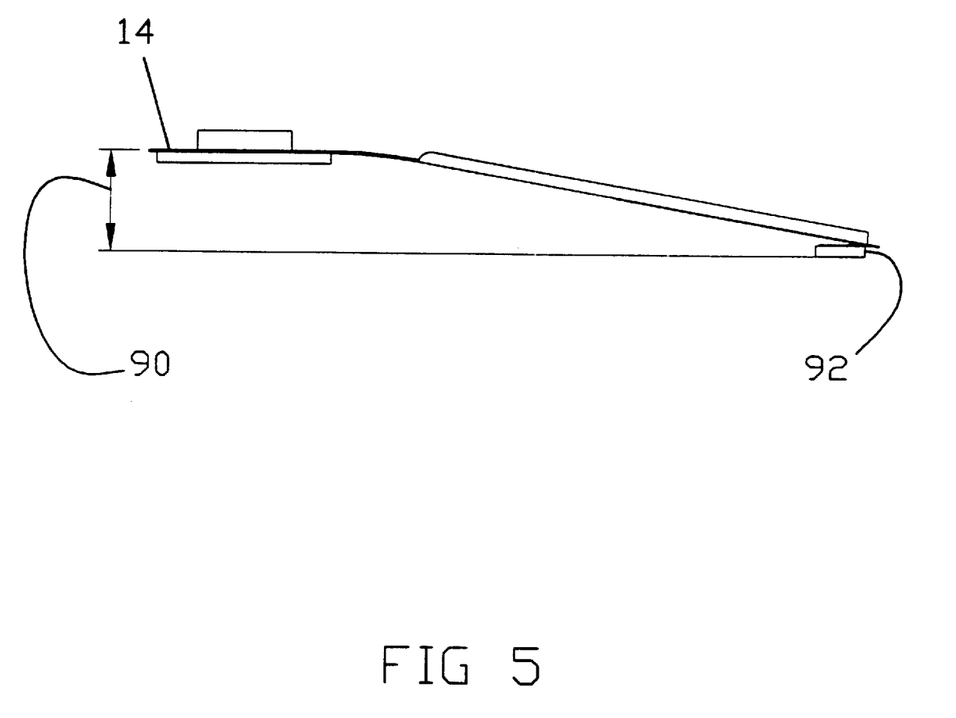
FIG. 5 is a side view of a head suspension similar to that shown in FIG. 1 showing the Z-height of the load beam.

Further, damper 40 acts as a highly effective damper. FIG. 4 shows a graph of Z-height, along axis 80, versus first torsion resonance mode gain, along axis 82, for a Hutchinson Technology model T850 load beam, available from Hutchinson Technology Incorporated of Hutchinson, Minn. which is similar to load beam 12, both with and without damping structure 60. (As shown in FIG. 5, Z-height 90 is the vertical distance between the mounting region 14 of load beam 12 and a lower face of head slider 92.) The Z-height for a given load beam is dependent upon the environment in which the load beam is to be used. Thus, it is advantageous for a damper to be effective over a range of Z-heights. The first torsion gain is the gain in amplitude in decibels at the flexure of a head suspension over the amplitude of the frequency of the first torsion mode input at the base of a load beam. Data line 50 shows first torsion gain for a T850 load beam without a damping structure 60. Data line 52 shows first torsion gain for a T850 load beam with damping structure similar to damping structure 60. As shown, the first torsion gain of the damped head suspension is advantageously reduced from that of the undamped suspension for a range of Z-heights.

Preferably, the material from which damper 40 is formed has the following properties:

Loss Factor—10% or greater
   Glass Transition Temperature—40° C. to 120° C.
   Young's Modulus—>10 Megapascals
   Viscosity—1000 to 50,000 centipoise
   Operating Temperature Range—40° C. to 120° C.
   UV curable Preferably, the material having these properties from which damper 40 is formed is visco-elastic material, but need not be. A number of viscoelastic materials are suitable for use as damper 40 such as "LOCTITE" "CHIBONDER" 348 brand adhesive; "LOCTITE" Product 3540 brand epoxy encapsulant; and "LOCTITE" Product 3544 brand epoxy encapsulant; all available from Loctite Corporation of Rocky Hill, Conn. Preferably, "LOCTITE" Product 395 brand adhesive, also available from Loctite Corporation of Rocky Hill, Conn. is used to form damper 40. The material used to form the damper is dispensed into the reservoir 70 formed by dam 30 by hand or otherwise. The thickness of the damper is controlled by controlling the volume of damping material dispensed into dam 30 and can be varied depending upon the degree of damping desired.

Load beams such as 12 are typically manufactured from a single sheet of stainless steel or other similar material using methods known in the art. Blanks are chemically etched to the appropriate dimensions, the blanks are then formed to provide a spring region 18, rigid region 22 and mounting region 14. Epoxy to form dam 30 can be dispensed onto the rigid region 22 of load beam 12 either before or after formation of the spring region 18. Dam 30 can then be exposed to UV radiation for anywhere from 10 seconds to 3 minutes to allow the epoxy to pre-cure. The epoxy can also be cured with damper material. Dam 30 is then filled with damper material by hand or otherwise. The damper 40 can then be heat or U.V. cured. It is also contemplated to form a damping structure without a reservoir 70; visco-elastic material or the epoxy material used to form dam 30 can simply be dispensed onto the head suspension.

Figure 6:
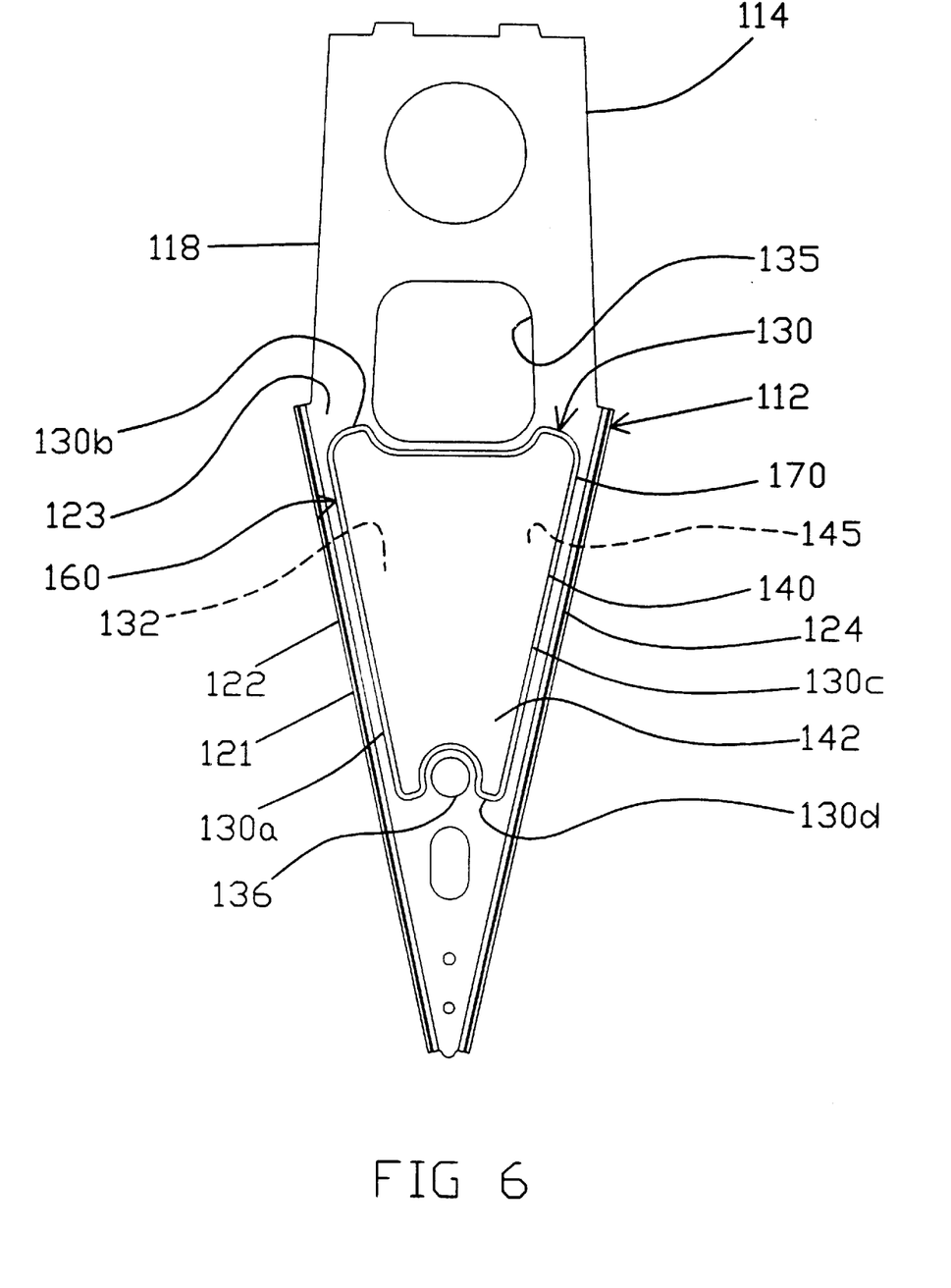
FIG. 6 a top view of another embodiment of a load beam having a reservoir and damper located thereon in accordance with the present invention.

Another embodiment of the present invention is shown in FIG. 6. Elements in FIG. 6 functionally similar to those of FIG. 1 are shown with like numerals incremented by 100. FIG. 6 shows load beam 112 with a damping structure 160 in damping region 145, which is in the rigid region 122 of load beam 112. Like damping region 45, damping region 145 is continuous or unbroken and supports damping structure 160. Damping structure 160 includes reservoir 170 and damper 140. Reservoir 170 is formed by darn 130 extending from base 132 which is part of the top surface 123 of the rigid region 122 of load beam 112. Dam 130 is formed in the rigid region 122 on the load beam 112 and includes straight walls 130*a* and 130*c* and curved walls 130*b*, and 130*d*. Straight walls 130*a* and 130*c* are parallel to edge rails 121 and 124, respectively. Curved wall 130*b* curves around an opening 135 in the spring region 118 of load beam 112 and curved wall 130*d* curves around an alignment aperture 136 in the rigid region 122 of load beam 112.

Damper 140 is located inside the reservoir 170 formed by dam 130. As such, damper 140 has an unconstrained top surface 142. Dam 130 and damper 140 can be formed of the same materials and in a similar manner as dam 30 and damper 40, respectively.

Figure 7:
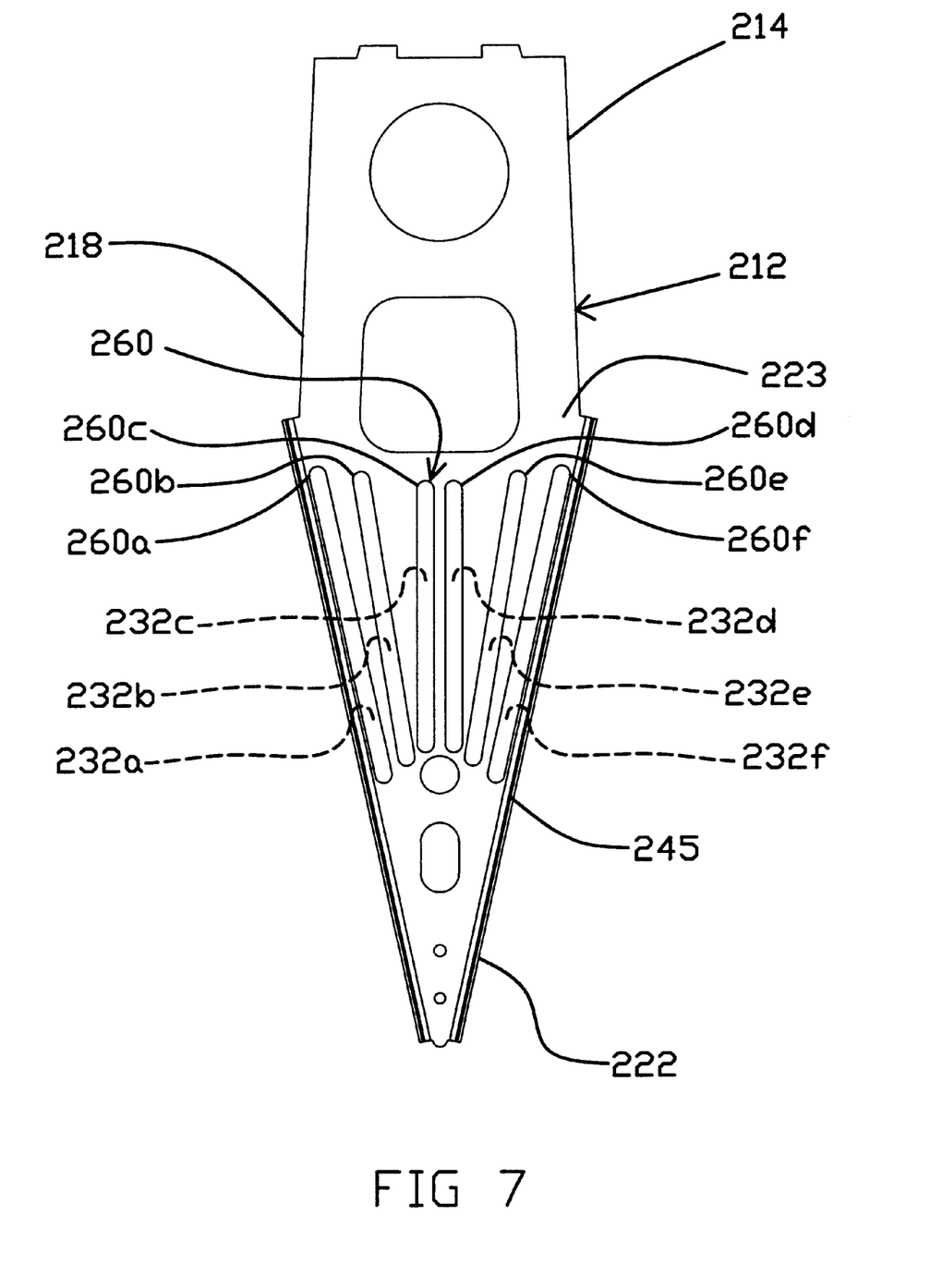
FIG. 7 is a top view of another embodiment of a load beam including a plurality of linear damping structures located thereon in accordance with the present invention.

Another embodiment of the present invention is shown in FIG. 7. Elements in FIG. 7 functionally similar to those of FIG. 1 are shown with like numerals incremented by 200. FIG. 7 shows load beam 212 with a damping structure 260 formed from a plurality of linear damping structures 260*a*, 260*b*, 260*c*, 260*d*, 260*e*, and 260*f* on damping region 245 of load beam 212. Like damping region 45, damping region 245 is continuous or unbroken and supports damping structures 260*a* through 260*f*. Damping structures 260*a*, 260*b*, 260*c*, 260*d*, 260*e* and 260*f* are formed on top of bases 232*a*, 232*b*, 232*c*, 232*d*, 232*e*, and 232*f*, respectively. Bases 232*a* through 232*f* are each formed by a portion of top face 223 of the rigid region 222 of load beam 212. Damping structures 260*a* through 260*f* are formed in the rigid region 222 of load beam 212 and are generally aligned with each other in the longitudinal direction of load beam 212.

Damping structures 260*a* through 260*f* are preferably substantially homogeneous, linear strips formed completely from epoxy. Preferably, damping structures 260*a* through 260*f* are formed from the same material from which dam 30 is preferably formed, specifically Electronic Materials Incorporated Emcast 1748 HTG-HV3 epoxy, part number 30217118, available from TC Services, Inc. of Bloomington, Minn. Damping structures 260*a*, 260*b*, 260*c*, 260*d*, 260*e*, and 260*f* each have an upper surface which is unconstrained. Damping structures 260*a* through 260*f* are formed on load beam 212 in substantially the same manner as dam 30. Different configurations of damping structures are also within the scope of the present invention. It is also considered to form damping structures using only visco elastic damper material, for example, the material preferably used to form damper 40 above, specifically, "LOCTITE" Product 395 brand adhesive, available from Loctite Corporation of Rocky Hill, Conn.

Figure 8:
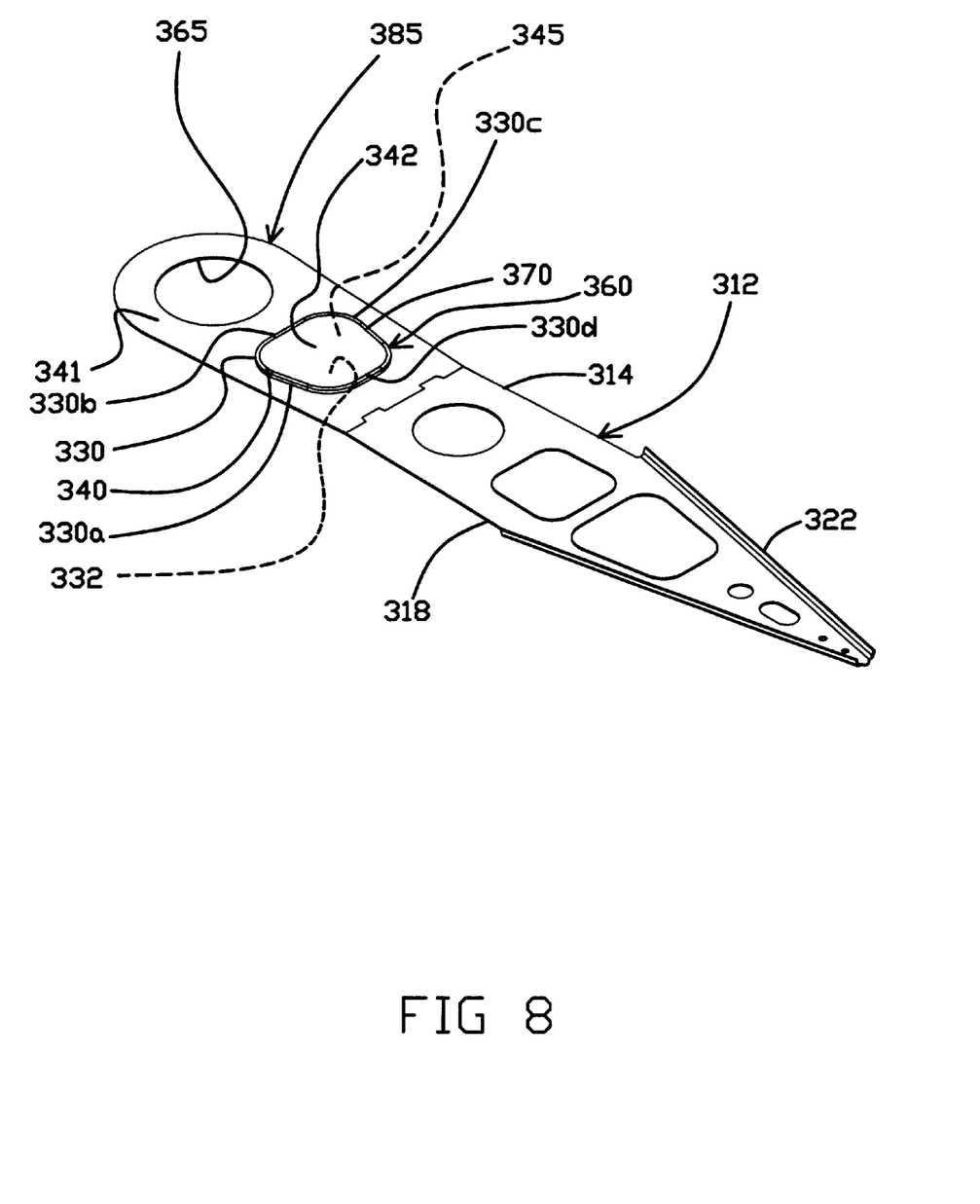
FIG. 8 is an isometric view of another embodiment of the present invention including an actuator arm with a reservoir and damper located thereon.

Another embodiment of the present invention is shown in FIG. 8. Elements in FIG. 8 functionally similar to those of FIGS. 1 and 2 are shown with like numerals incremented by 300. FIG. 8 shows load beam 312 mounted to an actuator arm 385. Aperture 365 is formed in actuator arm 385 for mounting actuator arm 385 to a servo drive (not shown). Actuator arm 385 has formed thereon a damping structure 360 in damping region 345. Like damping region 45, damping region 345 is continuous or unbroken and supports damping structure 360. Damping structure 360 is formed from a reservoir 370 containing a damper 340. The reservoir 370 is formed by dam 330 having substantially the same shape as dam 30 shown in FIG. 1. Dam 330 is formed from straight walls 330*a*, 330*b*, 330*c*, and 330*d* and base 332 formed from a portion of a top surface 341 of arm 385. Dam 330 is filled with damper material to form damper 340. Damper 340 is constrained on 5 sides by straight walls 330*a*, 330*b*, 330*c*, and 330*d* and base 332. A top surface 342 of damper 340 remains unconstrained. Dam 330 and damper 340 act to damp vibrations of actuator arm 385.

Actuator arms such as actuator arm 385 are typically manufactured from a single sheet of stainless steel or other similar material using methods known in the art. Blanks are stamped or otherwise formed to the appropriate dimensions and aperture 365 can be chemically etched or otherwise formed in actuator arm 385. Dam 330 and damper 340 can be formed from the same materials and in a manner similar to dam 30 and damper 40, respectively.

It is also contemplated to place the damping structure in other locations on the head suspension. For example, the damping structure can be placed near the tip of the load beam above the flexure, in the spring region, in the mounting region, or between the spring region and the mounting region. The precise placement and configuration of the damping structure is dependent upon the dynamics of the particular head suspension being damped and the resonance mode or modes for which damping is desired.

As is apparent from the embodiments of the present invention described above and shown in the Figures, reservoirs and dampers can be formed in different shapes and in differing numbers and be placed in different locations on the head suspension. As such, the damping structures of the present invention can be used for a wide range of head suspensions already in production. Further, the application of the damping structures of the present invention to head suspensions can be easily integrated into the manufacturing processes of the head suspensions. The damping structures of the present invention can also be added to a head suspension at relatively low cost.

Figure 9:
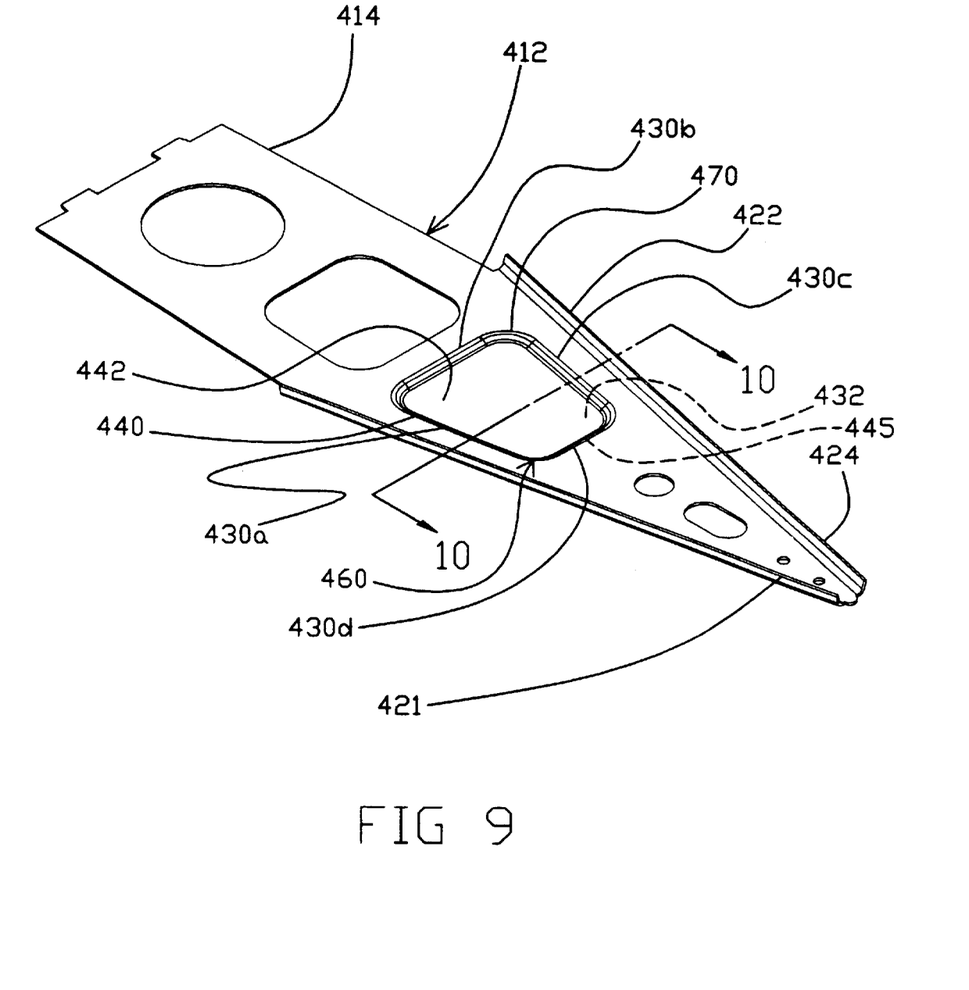
FIG. 9 is an isometric view of another embodiment of a load beam including a reservoir stamped therein and a damper in accordance with the present invention.
Figure 10:
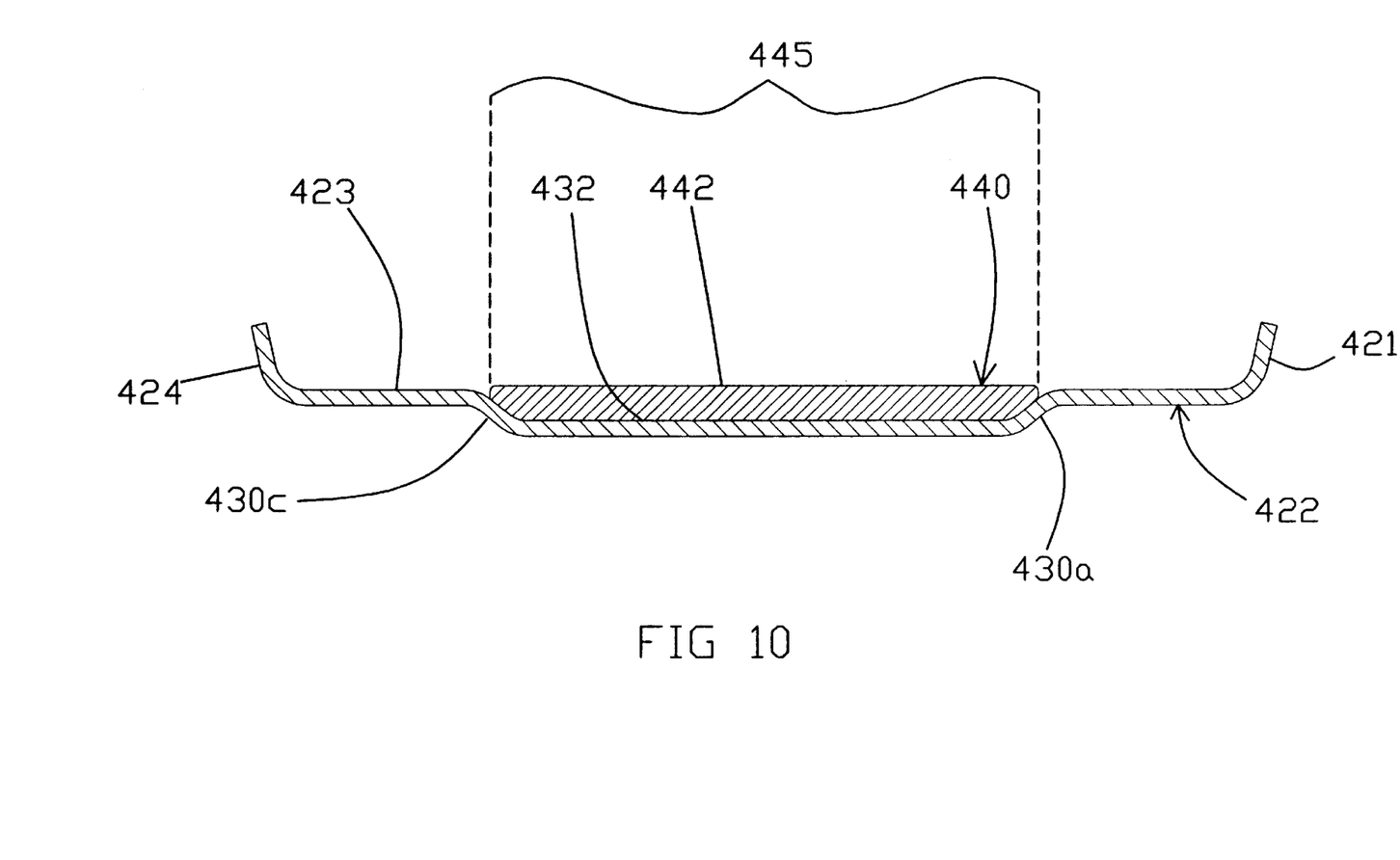
FIG. 10 is a sectional view of the load beam shown in FIG. 9 taken along section line 10—10 of FIG. 9.

An alternate embodiment of the present invention is shown in FIGS. 9 and 10. Elements in FIGS. 9 and 10 functionally similar to those of FIGS. 1 and 2 are shown with like numerals incremented by 400. FIG. 9 shows load beam 412 including damping region 445 supporting a damping structure 460 in the rigid region 422 of load beam 412. Like damping region 45, damping region 445 is continuous or unbroken. Damping structure 460 includes reservoir 470 in the rigid region 422 formed from the stainless steel of the load beam 412. Reservoir 470 is generally trapezoidal in shape and has straight side walls 430a, 430b, 430c, and 430d and a base 432 formed from a portion of the top surface 423 of the rigid region 422 of load beam 412. Side walls 430a and 430c are substantially parallel to edge rails 421 and 424, respectively, of load beam 412 and side walls 430b and 430d connect side wall 430a to side wall 430c. Side walls 430a through 430d and base 432 are all formed from the stainless steel in the rigid region 422 of load beam 412.

Contained within reservoir 470 is damper 440 which is formed of visco-elastic material. Damper 440 is constrained on 5 sides by base 432 and walls 430a, 430b, 430c, and 430d. However, a top surface 442 of damper 440 is unconstrained.

Load beam 412 and damper 440 can be fabricated as described above with respect to load beam 12 and damper 40, respectively. Reservoir 470 can be stamped in load beam 412. Figure 10 is a sectional view of load beam 412 wherein reservoir 470 is stamped in the rigid region of load beam 412. In this embodiment, walls 430a, 430b, 430c and 430d and base 432 extend below the surface of the remainder of the load beam.

Figure 11:
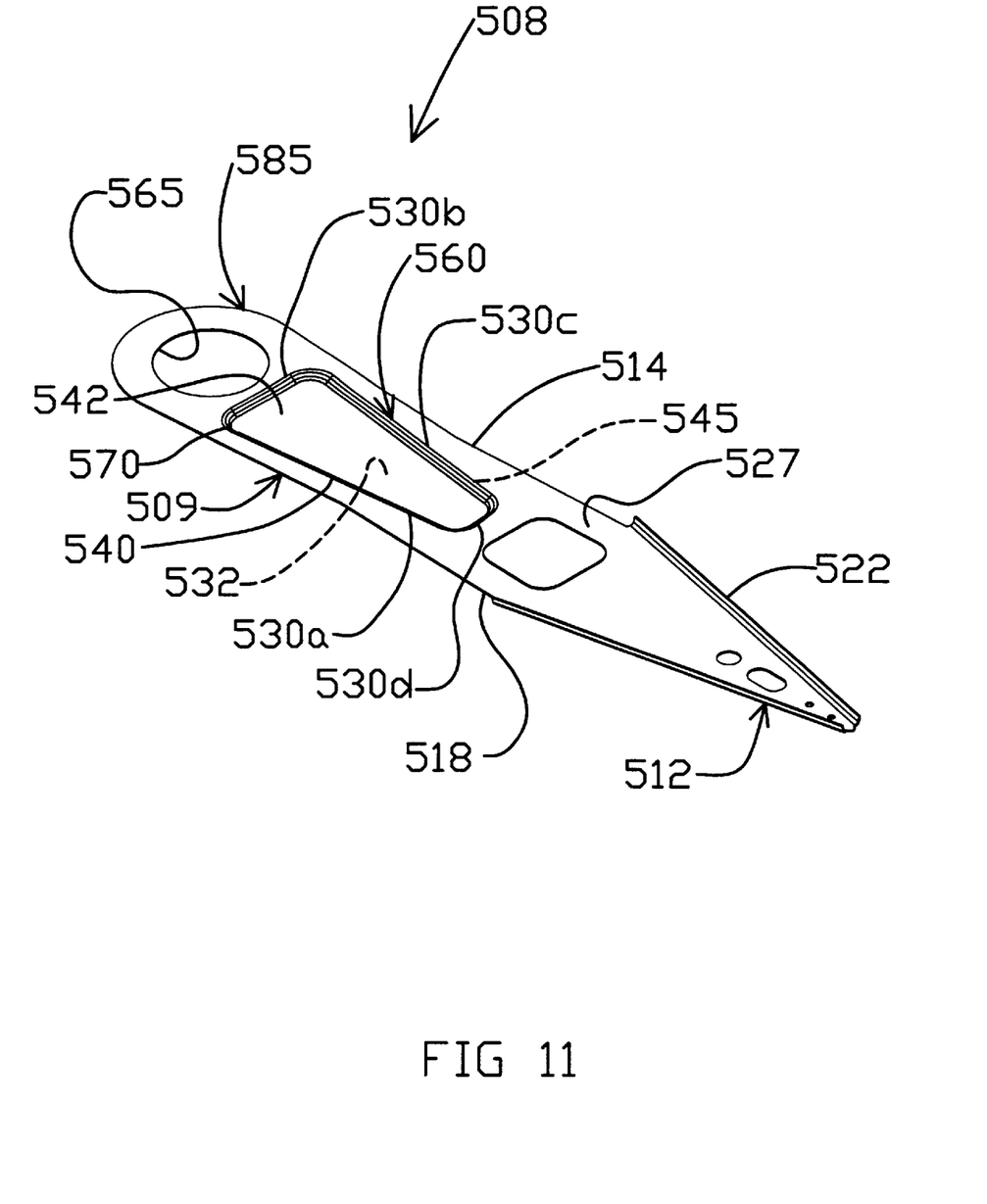
FIG. 11 is an isometric view of another embodiment of the present invention including an extended arm having a reservoir and damper.

FIG. 11 shows yet another embodiment of the present invention. Elements in FIG. 11 functionally similar to those of FIG. 8 are labeled with like numerals incremented by 200. FIG. 11 shows a head suspension 508 in which a single extended arm 509 includes both a load beam portion 512 and an actuator arm portion 585. The load beam portion includes rigid region 522, spring region 518 and an extended base region 514. Actuator arm portion 585 includes aperture 565 for mounting extended arm 509 to an actuator. Between aperture 565 and spring region 518, in the extended base 514 of load beam portion 512, extended arm 509 includes damping region 545 supporting a damping structure 560. Like damping region 45, damping region 545 is continuous, that is, the portion of extended arm which makes up damping region 545 has no apertures extending completely therethrough. Damping structure 560 includes a reservoir 570 formed from the same material, preferably stainless steel, as the remainder of the extended arm 509. Reservoir 570 is generally trapezoidal in shape and has straight side walls 530a, 530b, 530c, and 530d and a base 532 formed from a portion of the top surface 527 of the extended base region 514.

Contained within reservoir 570 is damper 540 which is formed of visco-elastic material. Damper 540 is constrained on 5 sides by base 532 and walls 530a, 530b, 530c, and 530d. However, a top surface 542 of damper 540 remains unconstrained.

Extended arm 509 and damper 540 can be fabricated as described above with respect to load beam 12 and damper 40, respectively. Reservoir 570 is preferably stamped in extended base region 514. As such, walls 530a, 530b, 530c and 530d and base 532 extend below the surface of the remainder of extended arm 509.

Figure 12:
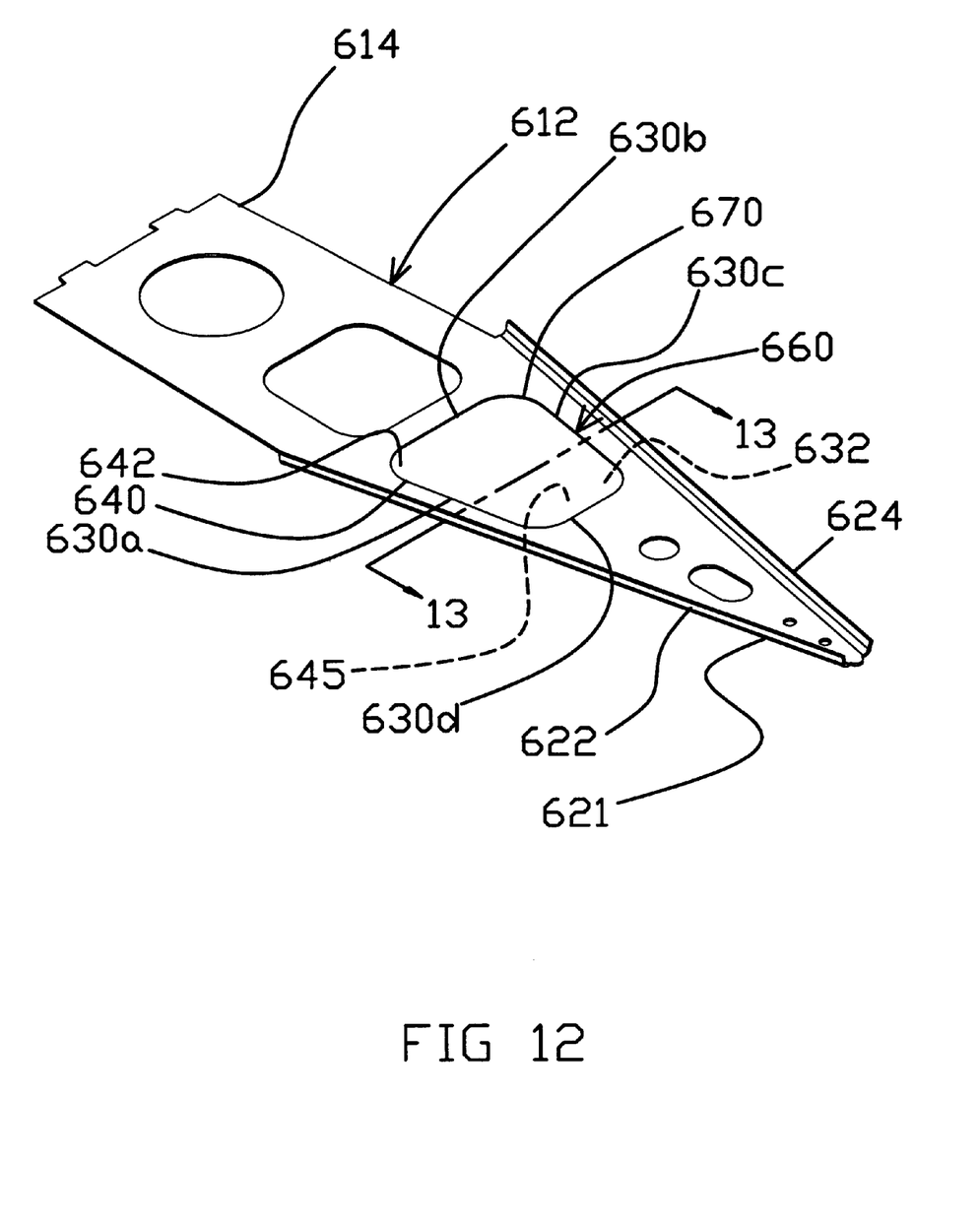
FIG. 12 is an isometric view of another embodiment of a load beam including a reservoir partially etched therein and a damper in accordance with the present invention.

FIG. 12 shows yet another embodiment of the present invention. Elements in FIG. 12 functionally similar to those of FIG. 1 are labeled with like numerals incremented by 600. Load beam 612 includes a damping region 645 in the rigid region 622 of load beam 612. Damping region 645, like damping region 45, is formed from a continuous section of load beam 612. Damping region 645 supports damping structure 660 which includes a reservoir 670 in the rigid region 622 formed from the stainless steel of the load beam 612. Reservoir 670 is generally trapezoidal in shape and has straight side walls 630a, 630b, 630c, and 630d and a base 632 formed from a portion of the top surface 623 of the rigid region 622 of load beam 612. Side walls 630a and 630c are substantially parallel to edge rails 621 and 624, respectively, of load beam 612 and side walls 630b and 630d connect side wall 630a to side wall 630c. Side walls 630a through 630d and base 632 are all formed from the stainless steel in the rigid region 622 of load beam 612.

Contained within reservoir 670 is damper 640 which is formed of visco-elastic material. Damper 640 is constrained on 5 sides by base 632 and walls 630a, 630b, 630c, and 630d. However, a top surface 642 of damper 640 is unconstrained.

Figure 13:
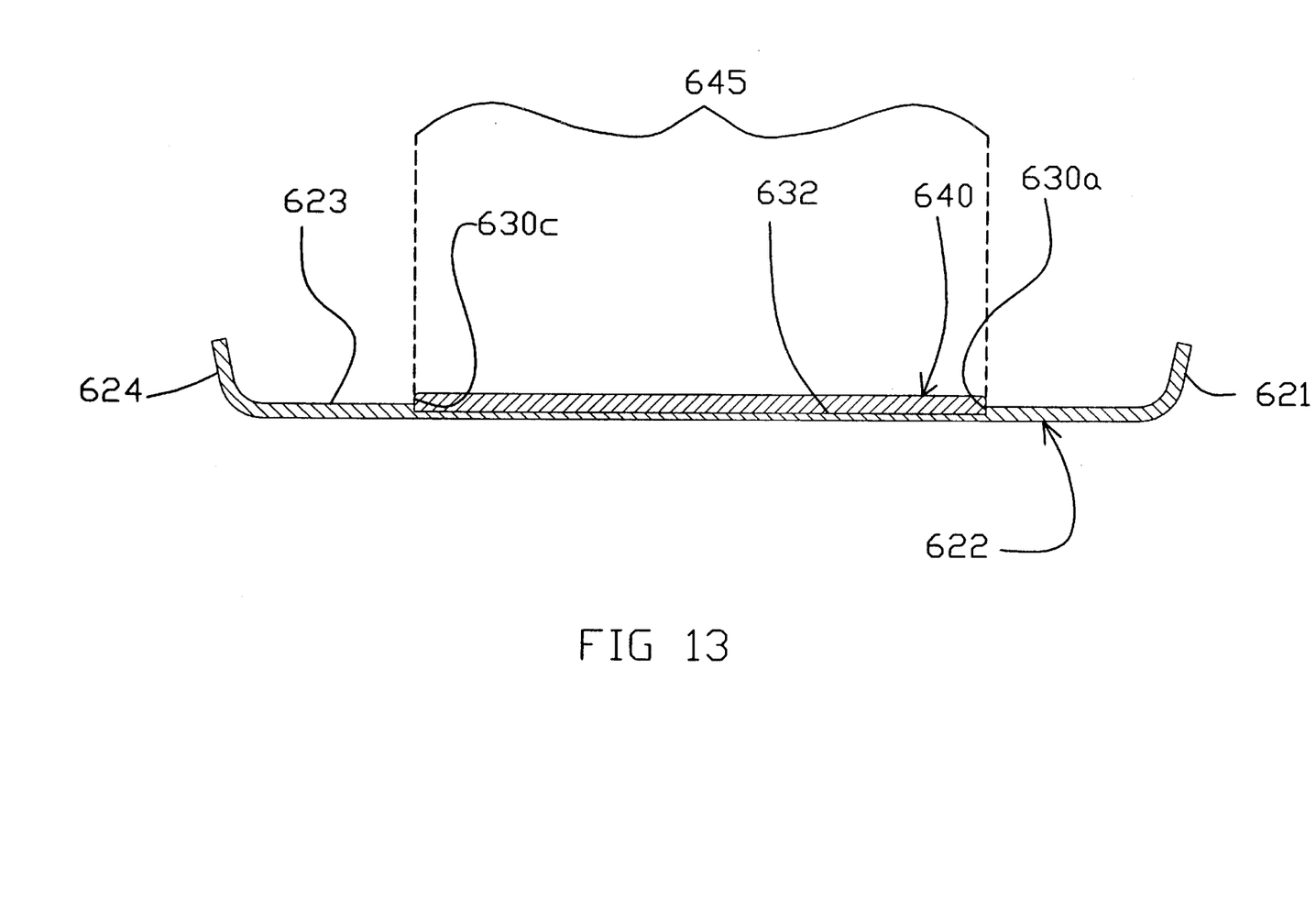
FIG. 13 is a sectional view of the load beam shown in FIG. 11 taken along section line 13—13 of FIG. 12.

Load beam 612 and damper 640 can be fabricated as described above with respect to load beam 12 and damper 40, respectively. Reservoir 670 is preferably partially etched in load beam 612. FIG. 13 is a sectional view of load beam 612 taken along section line 13—13 of FIG. 12 showing reservoir 670 partially etched in the rigid region of load beam 612. In this embodiment, walls 630a, 630b, 630c and 630d and base 632 do not extend below the surface of the remainder of the load beam.

Though the present invention has been described with reference to preferred embodiments, those skilled in the art will recognize that changes can be made in form and detail without departing from the spirit and scope of the invention.

What is claimed is:

1. A head suspension for supporting a read/write head and comprising:
   a load beam having at least one edge rail a mounting region at a proximal end, a rigid region adjacent to a distal end, and a spring region between the mounting region and the rigid region;
   a flexure at the distal end of the load beam and for supporting a head slider;
   one or more reservoirs defining a damping region on the head suspension, each reservoir surrounding a continuous surface; and
   a volume of damper material within each reservoir and having a first major surface and a second major surface oppsite the first major surface, wherein a substantial portion of the first major surface overlays and is supported by the continuous surface of the damping region and at least a substantial portion of the second major surface opposite the first major surface is unconstrained, the unconstrained damper material for significantly damping resonance vibrations of the head suspension.

2. The head suspension of claim 1 wherein the one or more reservoirs each include a base and at least a first wall extending from the base.

3. The head suspension of claim 2 wherein the first wall is formed by an epoxy dam.

4. The head suspension of claim 3 wherein the damper material includes visco-elastic material.

5. The head suspension of claim 4 wherein the epoxy dam and the visco-elastic material are located on the rigid region of the load beam.

6. The head suspension of claim 5 wherein the one or more reservoirs includes a single reservoir located on the rigid region of the load beam and the single reservoir has four walls which form a generally trapezoidal shape.

7. The head suspension of claim 2 wherein the head suspension is formed from plastically deformable spring material and the one or more reservoirs are formed unitarily with the head suspension and from the same spring material as the head suspension.

8. The head suspension of claim 7 wherein the damper material includes visco-elastic material.

9. The head suspension of claim 8 wherein the one or more reservoirs are stamped in the head suspension.

10. The head suspension of claim 9 wherein the one or more reservoirs includes a single reservoir located in the rigid region of the load beam and the single reservoir has four walls which form a generally trapezoidal shape.

11. The head suspension of claim 9 further including an extended arm wherein the load beam is unitary with the extended arm and the extended arm includes an actuator mounting region at a proximal end and an extended base region between the spring region of the load beam and the actuator mounting region and further wherein the one or more reservoirs includes a single reservoir located in the extended base region, the single reservoir having four walls which form a generally trapezoidal shape.

12. The head suspension of claim 8 wherein the one or more reservoirs are partially etched in the head suspension.

13. The head suspension of claim 12 wherein the one or more reservoirs includes a single reservoir located in the rigid region of the load beam and the single reservoir has four walls which form a generally trapezoidal shape.

14. The head suspension of claim 1 wherein the damping material includes epoxy and is formed into a plurality of linear strips.

15. The head suspension of claim 14 wherein the linear strips of damping material are on the rigid region of the load beam.

16. The head suspension of claim 2 further including an actuator arm to which the load beam is mounted and wherein at least one of the one or more reservoirs is located on the actuator arm.

17. The head suspension of claim 16 wherein the damper material includes visco-elastic material.

18. The head suspension of claim 17 wherein the reservoir located on the actuator arm includes four walls which form a generally trapezoidal shape.

19. A method of manufacturing a head suspension having a damper, comprising the steps of:
providing a head suspension having a load beam with at least the edge rail a mounting region at a proximal end, a rigid region adjacent to a distal end, and a spring region between the mounting region and the rigid region;
forming one or more reservoirs to define a damping region on a continuous surface in the head suspension; and
placing a volume of damping material within each reservoir on the continuous damping region surface, the volume of damping material having a first major surface with at least a substantial portion which is supported by and overlays the continuous damping region surface for significantly damping resonance vibrations of the head suspension and such that at least a substantial portion of a second major surface of the damping material opposite the first surface of the damping material remains unconstrained.

20. The method of claim 19 wherein the step of forming the one or more reservoirs includes forming one or more reservoirs each having a base and at least a first wall extending from the base.

21. The method of claim 20 wherein the step of forming the one or more reservoirs includes forming at least the first wall of each reservoir with a dam of epoxy.

22. The method of claim 21 wherein the step of placing damping material in the one or more reservoirs includes dispensing visco-elastic damping material into the one or more reservoirs.

23. The method of claim 20 wherein the step of forming one or more reservoirs includes forming one or more reservoirs on the rigid region of the load beam.

24. The method of claim 23 wherein the step of forming one or more reservoirs includes forming only a single reservoir in the rigid region of the load beam, the single reservoir having a generally trapezoidal shape.

25. The method of claim 20 wherein:
the step of providing the head suspension includes providing a head suspension formed of a plastically deformable spring material; and
the step of forming one or more reservoirs includes stamping one or more reservoirs in the head suspension in the same spring material from which the head suspension is formed.

26. The method of claim 25 wherein the step of placing damping material in the one or more reservoirs includes dispensing visco-elastic damping material into the one or more reservoirs.

27. The method of claim 26 wherein the step of forming one or more reservoirs includes forming one or more reservoirs in the rigid region of the load beam.

28. The method of claim 27 wherein the step of forming one or more reservoirs includes forming a single reservoir in the rigid region of the load beam, the single reservoir having a generally trapezoidal shape.

29. The method of claim 20 wherein:
the step of providing the head suspension includes providing a head suspension formed of a plastically deformable spring material; and
the step of forming one or more reservoirs includes partially etching one or more reservoirs in the head suspension in the same spring material from which the head suspension is formed.

30. The method of claim 20 wherein:
the step of providing a head suspension includes providing a head suspension having an extended arm a portion of which forms the load beam, the extended arm including an actuator mounting region at a proximal end, and an extended base region between the spring region of the load beam and the actuator mounting region; and
the step of forming one or more reservoirs includes forming one or more reservoirs in the extended base of the extended arm.

31. The method of claim 30 wherein the one or more reservoirs are stamped in the extended base region of the extended arm.

32. The method of claim 20 wherein:
the step of providing a head suspension includes providing a head suspension having an actuator arm to which the load beam is mounted; and
the step of forming one or more reservoirs on the head suspension includes forming a single reservoir on the actuator arm.

33. The method of claim 19 wherein the step of forming one or more reservoirs includes forming a plurality of linear reservoirs in the rigid region of the load beam.

* * * * *

UNITED STATES PATENT AND TRADEMARK OFFICE
CERTIFICATE OF CORRECTION

PATENT NO. : 6,271,996 B1
DATED : August 7, 2001
INVENTOR(S) : Galen D. Houk

It is certified that error appears in the above-identified patent and that said Letters Patent is hereby corrected as shown below:

Column 8,
Line 25, after "rail" insert a comma
Line 36, delete "oppsite" and insert therefor -- opposite Column 9,
Line 34, delete "the" and insert therefor -- one --; after "rail" insert a comma Column 10,
Line 37, after "arm" insert a comma Signed and Sealed this Fifteenth Day of January, 2002

Attest:

JAMES E. ROGAN
Director of the United States Patent and Trademark Office

Attesting Officer